Sept. 28, 1971  KARL-AXEL GUSTAVSSON  3,608,281
APPARATUS FOR CLEANSING FLUE GASES
Original Filed Sept. 27, 1968  2 Sheets-Sheet 2

United States Patent Office 3,608,281
Patented Sept. 28, 1971

3,608,281
APPARATUS FOR CLEANSING FLUE GASES
Karl-Axel Göran Gustavsson, Enkoping, Sweden, assignor to Aktiebolaget Bahco, Stockholm, Sweden
Continuation of abandoned application Ser. No. 763,424, Sept. 27, 1968. This application June 19, 1970, Ser. No. 48,928
Claims priority, application Sweden, Oct. 19, 1967, 14,347/67
Int. Cl. B01f 3/04
U.S. Cl. 55—228          6 Claims

ABSTRACT OF THE DISCLOSURE

The invention relates to an apparatus for purifying the gases to remove sulphur dioxide. The apparatus comprises a container for a body of treatment liquid and is provided with a gas inlet so arranged that the gas is caused to flow substantially at right angles to the surface of the liquid therein. A treatment passage extends substantially vertically upwards from the liquid surface in the container, so that the gas after contact with the liquid flows substantially linearly therethrough entraining droplets of liquid. The container communicates below the liquid level with an equalizing tank having means for introducing alkali thereinto to maintain the treatment liquid at a suitable alkalinity and with means for introducing fresh water. The equalizing tank also has means to maintain the liquid level therein constant whereby the liquid level in the treatment container adjusts automatically to variations in the rate of gas supplied thereto.

---

Figure 1:
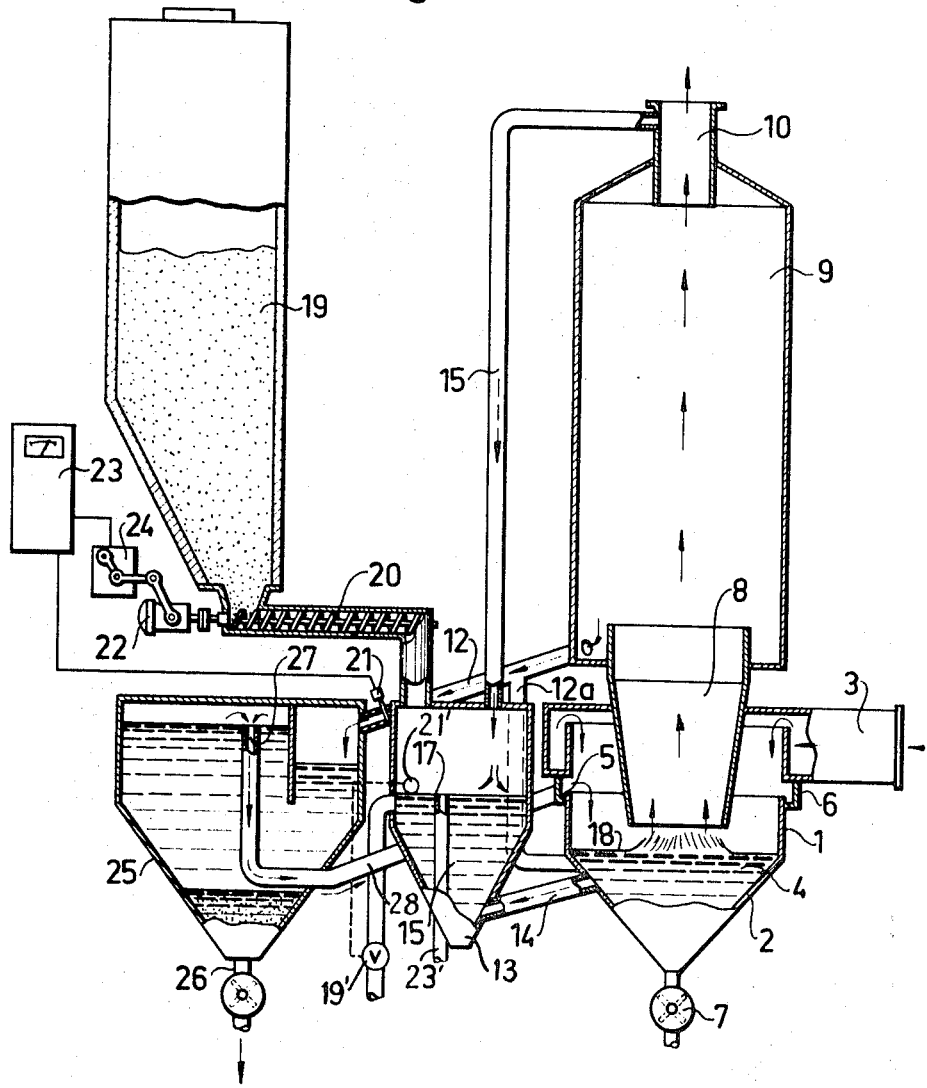

This is a continuation of application Ser. No. 763,424, filed Sept. 27, 1968 and now abandoned.

The present invention is concerned with an apparatus for cleansing flue gases of different impurities, primarily $SO_2$ and secondarily solid products of combustion such as soot, coke dust and ash.

The discharge of flue gases from different firing plants, e.g. oil firing plants, and waste gases from industrial processes represent a problem of increasing magnitude, mainly because of the quantities of $SO_2$ and soot which impurify the air as a result thereof. Consequently, it is becoming more and more urgent to find ways and means for the removal of such impurities from the flue gases in an effective and economic manner, in order to prevent the damage which such impurities cause, such as corrosion, poisoning of vegetation, smog formation etc. From the point of view of economy the discharge of $SO_2$ would seem to be most harmful of these impurities, as a result of the damage it causes due to corrosion.

The sulphur can be absorbed on solid substances having a wide specific surface, e.g. activated carbon or some other strongly expanded material, but the decontamination of these materials with soot and absorption of steam from the gases of combustion greatly impairs their utility in practice, since they would require an extensive exchange service and servicing program, resulting in too high costs.

It is also possible to cleanse the oil from sulphur in connection with the production process, but this would cause the price of oil to rise to such an extent that this possibility cannot be accepted.

A third method of removing sulphur impurities from flue gases is based on the well known fact that the $SO_2$ is readily absorbed in alkaline aqueous solutions. Two problems associated herewith, however, are first that a sufficient contact surface between the alkaline treatment liquid and the $SO_2$ bearing gas must be obtained, and secondly the length of time during which the gas and liquid are in contact must be sufficient to allow for practically one hundred percent absorption.

It is possible to obtain a wide contact surface by atomizing the alkaline treatment liquid. An obvious expedient for this purpose is the use of nozzles working under pressure. However, nozzles are prone to become blocked, worn and corroded, particularly when working with sludge bearing liquids. A more advantageous effect is obtained with an apparatus in which the liquid is atomized or broken down by causing the gas to attack the surface of the treatment liquid at high speed. The gas then carries the drops of water, up through a vertical treatment passage, the lower end of which terminates immediately above the surface of the liquid, and in which the absorption process is effected.

The other requirement to be fulfilled is one of sufficient contact time. This can be provided for by successively reducing the velocity of the gas during the flow upwards through the vertical treatment passage, which is designed as a diffusor for this purpose. In this way an appreciable portion of the kinetic energy of the gas is also recovered, and can be applied to break down the liquid.

The treatment passage or column is kept filled during the treatment process, with drops of the treatment liquid or absorption liquid itself. Thus, this column differs in advantage from such columns which in order to provide for the requisite contact surface are filled with packing bodies, which are overrun with liquid passed by a gas flowing slowly through the column, whereby very heavy structures result and the bed of packing bodies tends to become blocked with solid impurities in the gas or with the absorption agent.

By maintaining a suitable liquid level, gas velocity upon liquid entrainment and the angle at which the passage widens out it is possible to obtain very good filling of the passage with suspended droplets which adopt heights of suspension according to their size and there absorb $SO_2$, and which by precipitating on the walls and being recirculated to the liquid bath can also lead away the absorbed $SO_2$.

One problem associated with an apparatus of the aforementioned type, however, is that the treatment process is sensitive to variations in the distance between the level of the liquid in the container and the lower end of the passage, which is a decisive factor for the size of the droplets entrained by the gas, and hence for a given space velocity of the gas a truly effective effect is only obtained within a very narrow range for said distance. The process is thus difficult to control in the manner desired. Furthermore, it has been found that an apparatus of given dimensions functions best within a rather small range for the gas supply To enable the absorption arrangement to be controlled more easily and, at the same time, better suited for use with widely varying gas supply it is possible, according to the previous suggestion, to arrange an annular slot at the lower end of the treatment column, at such a height above the normal level of the liquid that an essentially liquid free part flow of gas passes through the slot. The effect of this annular flow of gas on the liquid droplets is to break down the droplets in the treatment column into considerably smaller droplets, whereby the amount of liquid which exists in droplet form in the treatment column increases considerably. The apparatus is thus less sensitive to variations in the liquid level, and, at the same time, also functions well with a more varying gas supply. The portion of the outlet passage below the slot can be produced in the form of a vertically movable connection pipe whose position vertically can be adjusted. The connection pipe can be arranged freely movable so that it automatically adjusts the width of the slot under the influence of the gas flow. However, it has been found that although this arrangement functions satisfactorily for a relatively long period of time it does in the course of time become less effective in apparatus for separating sulphur dioxide with the aid of alkali, particularly when the alkali is lime since sludge deposits form on the stationary surface of the apparatus at the slot, and thereby impairs its function.

The object of the present invention is to provide for automatic adjustment of the said liquid level in relation to the lower end of the treatment column under the influence of variations in the gas flow, so that the apparatus automatically adjusts itself to the prevailing gas flow, without the use of movable parts whose function might be impaired by blockages. This object is achieved by means of the present invention in that the container which houses the body of liquid and from which the treatment column extends communicates below the level of the liquid with an equalizing container or surge tank, the liquid level of which is held constant. Upon variations in the gas flow, and the subsequent changes in pressure above the body of liquid as a result thereof, the level of the liquid below the lower end of the treatment column will rise or fall, in accordance with the known principle for communicating vessels, so that the level of the liquid adjusts itself in response to the gas flow.

The invention is thus concerned with an apparatus for cleansing flue gas from primarily $SO_2$, and includes a container adapted to accommodate a quantity of treatment liquid and provided with a gas inlet so arranged that the gas is caused to flow substantially at right angles down towards the surface of the liquid in the container; and a treatment column directed essentially perpendicularly to the surface of the liquid and through which the gas flows essentially linearly away from the surface of the liquid whilst entraining droplets of liquid therefrom, and wherein the said container below the liquid level communicates with an equalizing tank provided with means for maintaining the level of the liquid therein constant.

Among the alkalis which can be used as treatment or absorption agents are primarily sodium hydroxide (caustic soda) and calcium hydroxide (hydrated lime). The caustic soda is obviously a more superior absorption agent, but since it is much too expensive, aqueous calcium hydroxide is generally used.

The hydrated lime may conveniently be metered direct in powder form to the equalizing tank, which may thus simultaneously serve as a dissolver, by means of a screw conveyor or other mechanical devices. The strong circulation of water effects the mixing and dissolving of the substances. Metering of the lime can also be controlled by instruments for controlling the pH value of the return liquid from the top of the treatment column, so that an alkali of pH 7–11 is maintained there. The lime solution thus becomes supersaturated in remaining parts of the system, and conventional iron plate can be used as construction material without too much risk for corrosion.

The only waste product is the sludge formed by the consumed hydrated lime and solid constituents and sulphur compounds washed from the flue gas. The sludge can be tapped off intermittently, through a pocket under the liquid bath. However, it is desirable to obtain a higher concentration than that obtained by self-sedimentation, and accordingly a fully automatic operating sludge thickener can be connected in the return circuit for the return liquid so that the sludge is discharged in the form of a concentrated paste while the liquid freed from sludge is passed back to the liquid bath. This liquid may suitably be returned so that it flushes the walls of the container free from any sludge which might have settled thereon.

The apparatus may include more than one treatment stage, wherewith subsequent to its exit from the treatment column and the droplet separating process the gas treated in the manner described above is caused to attack the surface of another liquid in a second container, and is passed through a further treatment column. In this instance a level regulator of the above described type is also incorporated in the second stage. The two equalizing tanks may also be connected together in a suitable manner.

The invention will now be described in detail with reference to the accompanying drawings, in which FIG. 1 shows a vertical section of a modified embodiment in which treatment is effected in two stages.

The apparatus shown in FIG. 1 includes a container presenting an essentially cylindrical upper portion 1 and a conical lower portion 2. A gas inlet passage 3 is arranged at the upper portion 1 of the container so that the gas flows essentially uniformly distributed into the container 1 and perpendicular to the body of liquid 4 therein. The liquid is introduced into the container through an inlet 5, which opens out into a channel 6 arranged around the upper portion of the container so that the supplied liquid flows uniformly distributed around the circumference and flushes the walls of the container 1 to remove any sludge deposits which might have formed thereon. A lower outlet provided with a valve 7 permits emptying of sludge and liquid when desired.

Projecting into the container 1, 2 is the lower end of a diffusor-shaped treatment passage 8 which is arranged coaxial with the container and which widens conically from the lower end. The height of passage 8 is greater than the diameter of its inlet and the diameter at its upper end is substantially greater than the diameter of the inlet. The upper end of the passage 8 extends into a cylindrical chamber 9 serving as a droplet separator and positioned coaxially with the treatment passage 8 and provided with an upper gas outlet 10 and a lower liquid outlet 11 connected with a pipe 12.

Arranged on the side of the container 1, 2 is a closed equalizing tank or surge tank 13, which is connected at the bottom with the lower portion of the container 1, 2 via a pipe 14 and which via a pipe 15 at the top communicates with the gas outlet 10 so that the same pressure prevails in the gas above the body of liquid 16 in the equalizing tank 13 as in the pipe 10. The pipe 15 may also pass direct to atmosphere. The container is also provided with a liquid supply conduit (not shown) and with means for holding the liquid level 17 constant, the level, as shown, being maintained somewhat above the lower end of the treatment passage 8. The container 13 may, for instance, be provided in its liquid inlet 19′ with a float controlled valve, the float being indicated at 21′, or valve controlled in some other way by the level of the liquid, which opens when the liquid level 17 tends to fall, and also with a spill-way pipe 23′ by way of which the liquid departs when the level rises.

Because the level 17 of the liquid is held constant the level 18 of the liquid in the container 1, 2 will automatically adjust itself in response to the pressure drop between the container 1, 2 and the gas outlet 10 at varying gas flows.

Lime is supplied from a lime storage tank 19 to the liquid in the equalizing tank 13 by means of a screw conveyor 20. A pH meter 21 is inserted in the pipe 12 for return liquid, and controls the drive motor 22 of the screw over a regulator 23 and a setting motor 24.

A part of the liquid is passed through the return pipe 12 to a settling tank 25 while a part is passed through a branch pipe 12a direct to the container 1, 2. The sludge settles in the tank 25 and can be removed through the outlet 26, while the liquid in the tank is passed, via a spill-way 27, through a pipe 28 to the aforementioned inlet 5 in the container 1, 2.

The function of the apparatus should be evident from the aforegoing, and hence need not be further described.

Figure 2:
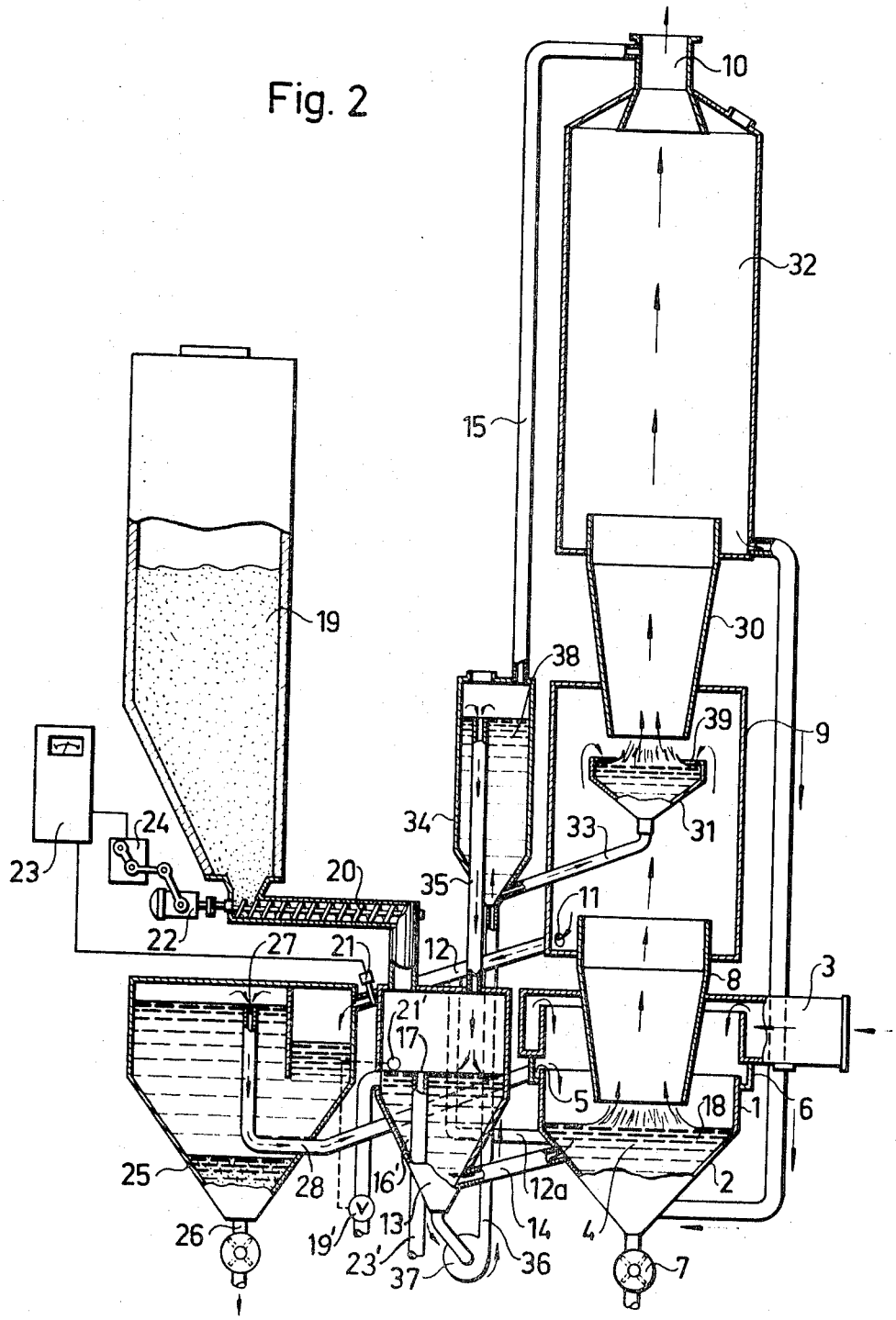

The embodiment shown in FIG. 2 coincides essentially with the above described, and corresponding elements have been identified with the same designations. These elements will not be described in detail.

In the embodiment shown in FIG. 2 the droplet separator instead of being connected to the outlet 10 is connected to a further diffusor-like treatment passage 30, the lower end of which lies somewhat above the liquid level in a liquid container 31 arranged in the upper portion of the droplet separator 9. The passage 30 opens out into an upper droplet separator 32, at the upper end of which is situated the outlet 10.

The upper liquid container 31 communicates, via a pipe 33, with an upper equalizing tank 34 in the same manner as the container 1, 2 communicates with the equalizing tank 13. In this instance the gas space in the equalizing tank 34 communicates with the outlet 10 via the pipe 15, while the two equalizing tanks 13 and 14 communicate through a spillway pipe 35 and a liquid lift pipe 36 having a pump 37.

The level 17 of the liquid in the tank 13 is held constant, as described above. The pump 37 supplies liquid to the container 34 continously, and the liquid level 38 is held constant by the interaction of the pump 37 and the spillway 35. It is understood that each of the liquid levels 18 and 39, is in this way, automatically controlled upon changes in the gas flow.

What is claimed is:

1. An apparatus for cleansing flue gases from primarily $SO_2$, which includes a container (1, 2) adapted to accommodate a quantity of alkaline treatment liquid, gas inlet means (3) communicating with the container and arranged so that the gas is caused to flow substantially at right angles down towards the surface of the liquid in the container, a chamber (9) a treatment passage (8) connected to the container and directed essentially perpendicular to the surface of the liquid and through which the gas flow essentially linearly away from said surface of the liquid to said chamber while entraining droplets of liquid therefrom, an equalizing tank (13) communicating with said container below the liquid level therein and having a substantially smaller horizontal cross sectional area than said container within the range for the liquid levels therein, a settling tank (25) for removing solid material from the treatment liquid, conduit means (12) providing communication between said chamber and said settling means for passing treatment liquid to said settling tank, conduit means (28) providing communication between said settling tank and said container for returning liquid from said settling tank to said container, means for maintaining a constant liquid within said equalizing tank, said means including a liquid inlet and a liquid outlet, and solid material feeding means in communication with said equalizing tank for supplying alkali in solid form to the liquid in the latter to maintain the alkalinity of said treatment liquid.

2. An apparatus according to claim 1, characterized in that the gas space of the equalizing tank communicates with the gas outlet of the treatment passage, or with atmosphere.

3. An apparatus according to claim 1 characterized in that it includes a further unit arranged in series with the container and treatment passage and in the form of a liquid container and treatment passage, wherein equalizing tanks of the aforementioned type are arranged for each liquid container.

4. An apparatus according to claim 3, characterized in that the second equalizing tank is positioned at higher level than the first and has a spill-way passing to the first equalizing tank, and that a pipe provided with a pump connects the liquid spaces of the two equalizing tanks.

5. An apparatus according to claim 2, characterized in that it includes a further unit arranged in series with the container and treatment passage and in the form of a liquid container and treatment passage, wherein equalizing tanks of the aforementioned type are arranged for each liquid container.

6. An apparatus according to claim 5, characterized in that the second equalizing tank is positioned at higher level than the first and has a spill-way passing to the first equalizing tank, and that a pipe provided with a pump connects the liquid of the two equalizing tanks.

References Cited

UNITED STATES PATENTS

| | | | |
|---|---|---|---|
| 821,425 | 5/1906 | Meehan | 55—239 |
| 2,233,520 | 3/1941 | Vigan | 55—249X |
| 2,379,338 | 6/1945 | Bingman | 261—119X |
| 2,720,280 | 10/1955 | Doyle | 261—119X |
| 2,839,153 | 6/1958 | Mollner | 261—119X |
| 3,130,024 | 4/1964 | Vaughan, Jr. | 261—119X |
| 3,353,800 | 11/1967 | Jens | 55—228X |

FOREIGN PATENTS

| | | |
|---|---|---|
| 574,591 | 1/1946 | Great Britain. |
| 904,028 | 8/1962 | Great Britain. |

TIM R. MILES, Primary Examiner

U.S. Cl. X.R.

55—249; 261—21, 119